No. 666,295. Patented Jan. 22, 1901.
J. A. WHEELER.
PROCESS OF MANUFACTURING DOORS.
(Application filed Aug. 18, 1899.)
(No Model.)
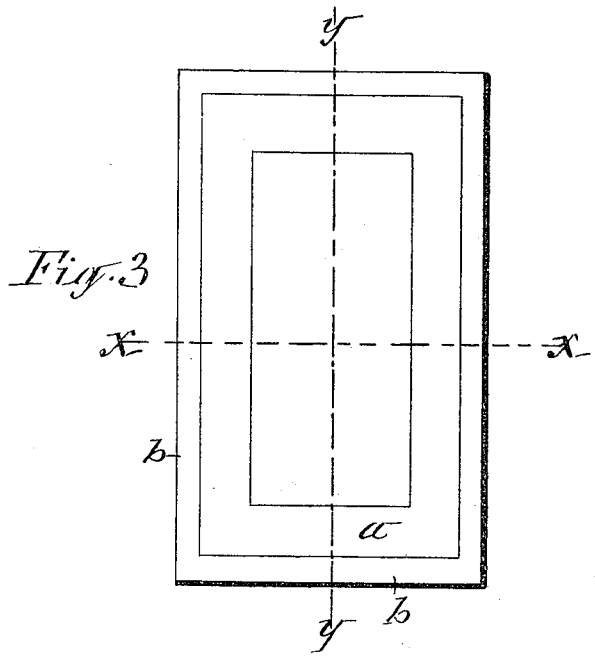
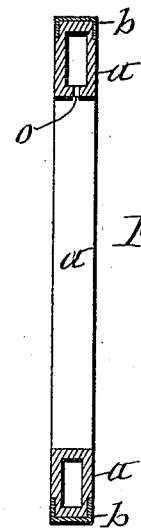
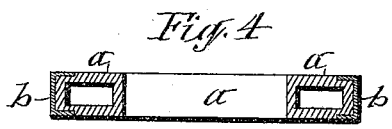
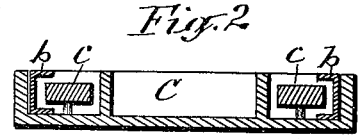
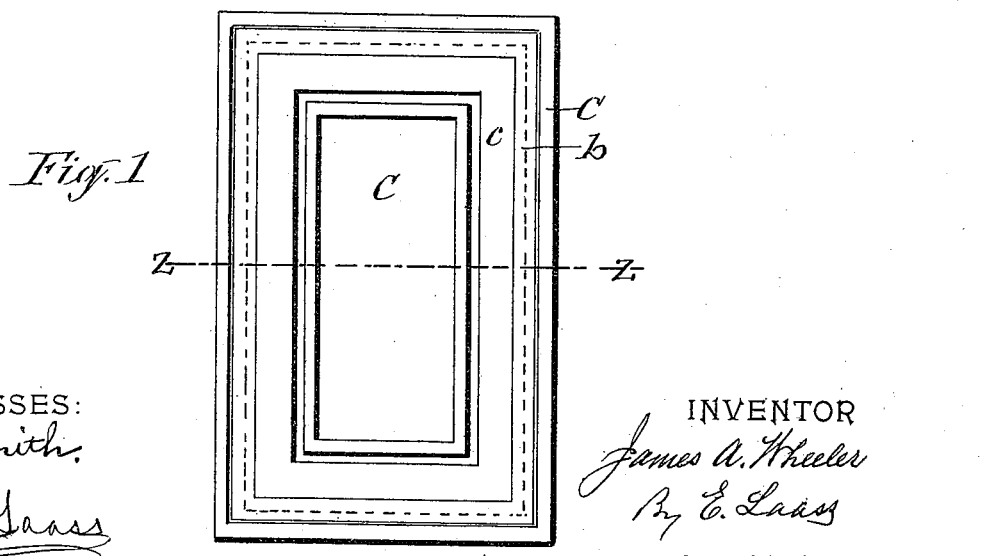
WITNESSES:
H. B. Smith.
J. J. Laass.
INVENTOR
James A. Wheeler
By E. Laass
ATTORNEY

UNITED STATES PATENT OFFICE.

JAMES A. WHEELER, OF OSWEGO, NEW YORK.

PROCESS OF MANUFACTURING DOORS.

SPECIFICATION forming part of Letters Patent No. 666,295, dated January 22, 1901.

Application filed August 18, 1899. Serial No. 727,639. (No specimens.)

*To all whom it may concern:*

Be it known that I, JAMES A. WHEELER, a citizen of the United States, and a resident of Oswego, in the county of Oswego, in the State of New York, have invented new and useful Improvements in Processes of Manufacturing Doors, of which the following, taken in connection with the accompanying drawings, is a full, clear, and exact description.

This invention relates to the manufacture of the panel-frames of doors, shutters, and analogous articles from solidifying artificial cement; and the invention consists in a novel process of manufacturing said frames, as hereinafter described, and set forth in the claims.

To enable others skilled in the art to which my invention pertains to more readily make and use the same, I have illustrated in the annexed drawings the successive steps of the process of practicing my invention.

In said drawings, Figure 1 is a plan view of the mold employed for manufacturing the aforesaid frame, together with the core for forming said article hollow or with an internal cavity, and also the metallic band placed in said mold to embrace the molded frame therein. Fig. 2 is a transverse section on line Z Z in Fig. 1. Fig. 3 is a plan view of the completed frame; and Figs. 4 and 5 are transverse sections on lines X X and Y Y, respectively, in Fig. 3.

In practicing my said invention I proceed as follows: I prepare a suitable plastic compound cement, which may be formed of the materials and in the manner described in my Patent No. 539,928, dated May 28, 1895. I then take a mold C, composed chiefly of inner and outer parallel walls arranged corresponding to the inner and outer edges of the frame to be molded. In said mold I place a core $c$, consisting of a frame corresponding to the general outline of the panel-frame to be manufactured, but of smaller dimensions with reference to thicknesses between the front and rear faces and between the outer and inner edges, which core I form by molding a suitable cohesive material into the required shape and of the required dimensions, preferably of a material which becomes disintegrated when subjected to pressure and heat. In order to strengthen and protect the edges of the molded frame, (indicated at $a$ in the drawings,) I place in the mold C, adjacent to the outer wall thereof, a metallic encompassing band $b$, corresponding to the outline of the article to be molded and preferably either L-shaped or T or U shaped in cross-section, so as to embrace the edges of the molded article. This metallic band surrounds the core $c$ and is placed at the necessary distance from said core to leave the space within which to mold the outer edge of the panel-frame to be manufactured. After the said band and core are placed in their positions I hold the plastic material between said band and inner wall of the mold C, so as to completely envelop the core $c$, and impart to the exposed portion of the molded cement the shape required of the frame $a$ to be manufactured. I then smooth the exterior of this frame and place it in suitable dies, preferably perforated in the rear face and heated. These dies, with the inclosed molded frame, I place in a suitable press to compress, dry, and harden said frame. After this is effected I remove the dies from the press and the dry and hardened frame from the dies. If the said frame is designed to form part of a door or shutter or analogous article and is to present a polished surface resembling wood with a decorative grain, I run over the surface of said frame a suitable elastic transferring-roller, preferably a gelatin-faced roller, carrying upon its surface a colored impression of the grain of the wood to be imitated.

In case it is desired to reduce the weight of the molded article I provide the same with an aperture $o$. (Shown in Fig. 5 of the drawings.) Through this aperture I expel the core $c$, which during the aforesaid compressing and drying step of the process becomes disintegrated and pulverulent, so as to allow it to freely pass out through the aperture while the article is turned over and rapped to loosen the core particles.

What I claim as my invention is—

1. The process of manufacturing doors, and analogous articles consisting in molding from cohesive material a core corresponding in general outline to the shape of the article to be manufactured, but of smaller perimeter and thickness, then completely enveloping said core in a coat of plastic cement, pressing said coat into more intimate contact with the enveloped core and imparting to the surface of said cement the shape of the article to be manufactured as set forth.

2. The process of manufacturing panel-frames consisting in forming from cohesive granular material a core corresponding in general outline to the aforesaid panel-frame, but of smaller dimensions with reference to thicknesses between the front and rear faces and between the outer and inner edges, forming a metallic encompassing band of greater perimeter than the exterior edges of the granular core, placing said band around the said core, then molding plastic cement around the core and onto the encompassing band and in the shape of the panel-frame to be manufactured, then compressing, drying and hardening the molded cement in the encompassing band and subsequently ejecting from the dry and hardened cement the material of the aforesaid core.

JAMES A. WHEELER. [L. S.]

Witnesses:
J. J. LAASS,
H. B. SMITH.